United States Patent
Chhabra et al.

(10) Patent No.: US 11,163,701 B2
(45) Date of Patent: Nov. 2, 2021

(54) SYSTEM, APPARATUS AND METHOD FOR INTEGRITY PROTECTING TENANT WORKLOADS IN A MULTI-TENANT COMPUTING ENVIRONMENT

(71) Applicant: Intel Corporation, Santa Clara, CA (US)

(72) Inventors: Siddhartha Chhabra, Portland, OR (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 211 days.

(21) Appl. No.: 16/191,961

(22) Filed: Nov. 15, 2018

(65) Prior Publication Data

US 2019/0087354 A1    Mar. 21, 2019

(51) Int. Cl.
    *H04L 29/00*     (2006.01)
    *G06F 12/14*    (2006.01)
    (Continued)

(52) U.S. Cl.
    CPC .......... *G06F 12/1408* (2013.01); *G06F 21/52* (2013.01); *G06F 21/53* (2013.01); *G06F 21/602* (2013.01); *G06F 21/64* (2013.01); *G06F 21/71* (2013.01); *G06F 21/72* (2013.01); *H04L 9/0631* (2013.01); *H04L 9/0637* (2013.01); *H04L 9/0894* (2013.01); *H04L 9/14* (2013.01); *H04L 9/3273* (2013.01); *H04L 63/0428* (2013.01);
    (Continued)

(58) Field of Classification Search
    CPC ........ G06F 21/64; G06F 21/105; G06F 21/62; G06F 21/72; G06F 21/60; G06F 12/1408; G06F 21/52; G06F 21/53; G06F 21/602; G06F 21/71; H04L 9/0631; H04L 9/0637; H04L 9/0894; H04L 9/14; H04L 9/3273; H04L 63/0428; H04L 63/061; H04L 63/126; H04L 63/1466; H04L 2463/062
    See application file for complete search history.

(56) References Cited

U.S. PATENT DOCUMENTS

2003/0200448 A1* 10/2003 Foster ................. G06F 21/64
                                                        713/189
2012/0102333 A1*  4/2012 Wong .................. G06F 21/60
                                                        713/189
(Continued)

OTHER PUBLICATIONS

U.S. Appl. No. 15/939,871, filed Mar. 29, 2018, entitled "System, Apparatus and Method For Providing Key Identifier Information in a Non-Canonical Address Space" by Siddhartha Chhabra, et al.
(Continued)

*Primary Examiner* — Ghazal B Shehni
(74) *Attorney, Agent, or Firm* — Trop, Pruner & Hu, P.C.

(57) ABSTRACT

In one embodiment, an apparatus includes a core to execute instructions, where in response to a first instruction, the core is to obtain an encrypted binary of a requester from a source location and store the encrypted binary to a destination location. The apparatus may further include a memory execution circuit coupled to the core that, in response to a
(Continued)

request from the core and based on the first instruction, is to generate at least one integrity value for the binary and store the at least one integrity value in association with the binary.

17 Claims, 8 Drawing Sheets

(51) Int. Cl.
| | | |
|---|---|---|
| *G06F 21/64* | (2013.01) | |
| *G06F 21/72* | (2013.01) | |
| *H04L 29/06* | (2006.01) | |
| *H04L 9/14* | (2006.01) | |
| *G06F 21/60* | (2013.01) | |
| *H04L 9/32* | (2006.01) | |
| *G06F 21/71* | (2013.01) | |
| *H04L 9/06* | (2006.01) | |
| *G06F 21/53* | (2013.01) | |
| *G06F 21/52* | (2013.01) | |
| *H04L 9/08* | (2006.01) | |

(52) U.S. Cl.
CPC .......... *H04L 63/061* (2013.01); *H04L 63/126* (2013.01); *H04L 63/1466* (2013.01); *H04L 2463/062* (2013.01)

(56) References Cited

U.S. PATENT DOCUMENTS

| | | | |
|---|---|---|---|
| 2012/0260106 A1* | 10/2012 | Zaks | .............. G06F 21/14 713/190 |
| 2016/0119137 A1* | 4/2016 | Sethumadhavan | .............. G06F 9/30178 713/190 |
| 2018/0018288 A1 | 1/2018 | Dewan et al. | |
| 2018/0247082 A1* | 8/2018 | Durham | .............. G06F 8/63 |

OTHER PUBLICATIONS

U.S. Appl. No. 15/714,217, filed Sep. 25, 2017, entitled "System, Apparatus and Method for Page Granular,Software Controlled Multiple Key Memory Encryption" by David M. Durham, et al.

U.S. Appl. No. 15/635,548, filed Jun. 28, 2017, entitled "Multi-Key Cryptographic Memory Protection" by Siddhartha Chhabra, et al.

U.S. Appl. No. 16/023,576, filed Jun. 29, 2018, entitled "Low Overhead Integrity Protection With High Availability for Trust Domains" by Siddhartha Chhabra, et al.

\* cited by examiner

SYSTEM, APPARATUS AND METHOD FOR INTEGRITY PROTECTING TENANT WORKLOADS IN A MULTI-TENANT COMPUTING ENVIRONMENT

TECHNICAL FIELD

Embodiments relate to protection of information in computing systems.

BACKGROUND

Memory security requirements are ever increasing as cloud service providers (CSPs) deploy servers in remote locations that might not have appropriate physical security. Multi-key total memory encryption (MKTME) techniques as implemented in multi-tenant computing environments allow customer workloads to be encrypted with different keys when resident in memory. While MKTME techniques provide defense against passive attacks on confidentiality, they do not provide any defense against active attacks where an attacker with physical access to the system can modify code/data in memory, potentially causing secrets to leak.

In order to address active attacks, memory integrity can be added on top of memory encryption. Traditional memory integrity mechanisms associate a cryptographic message authentication code (MAC) with each cacheline in memory that are stored in a sequestered region of memory. The MAC is generated as data is written to memory and verified as data is ready from memory. Any active attack on the data will result in a MAC mismatch, causing a security exception. While introducing a memory integrity mechanism to defend against modification attacks, it introduces additional overheads. Current solutions to provide integrity protection have proved difficult to implement in cloud-based implementations.

DETAILED DESCRIPTION

Figure 1:
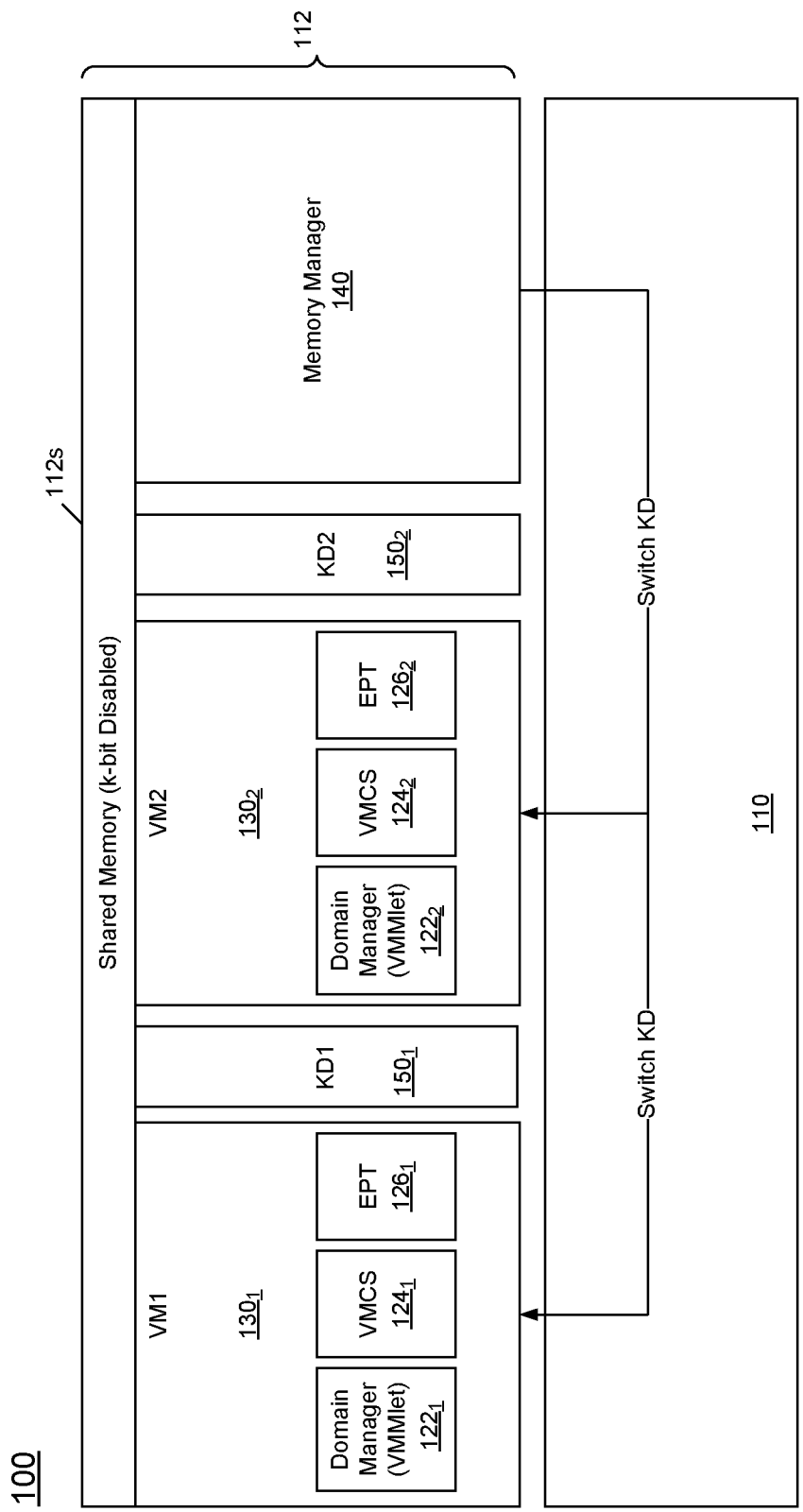
FIG. 1 is a block diagram of a virtual machine environment in accordance with one embodiment of the invention.

In various embodiments, techniques are provided to load binaries or other workloads to a computing system of cloud service provider (CSP) with integrity, even when the integrity values are not exposed to software of the CSP. To this end, embodiments provide a Load with Integrity (LDWINT) instruction of an instruction set architecture (ISA), and a mode of a MKTME engine to allow a tenant binary to be loaded with integrity. In turn, a customer providing the binary to the CSP can validate that the binary was indeed loaded to a system of the CSP with integrity values generated correctly.

To realize embodiments, a MKTME engine may be configured with an integrity only mode in which write operations generate an integrity value associated with the data being written, without performing any encryption. In an embodiment, this mode is activated by microcode through the LDWINT instruction. Untrusted software of the CSP may use this instruction with an identification of the customer binary to load to memory with integrity. In an embodiment, the instruction operates on page granularity and generates a cryptographic response using a key shared between the customer and cloud provider. This measurement is provided back to the customer, to enable verification that the binary was indeed loaded to memory with integrity using the LDWINT instruction. In a particular embodiment, execution of a given LDWINT instruction may load a page block of a binary into memory with associated integrity protection and send a cryptographic response per page back to the customer.

Embodiments may be used in a cloud environment, with one usage for virtual machine (VM) isolation. In a VM isolation solution an agent image is loaded in memory. The agent image is loaded in each trust domain (TD)/VM context using a key associated with the agent. The agent is responsible for editing critical structures associated with TD (e.g., virtual machine control structure (VMCS), extended page table (EPT)) on behalf of a virtual machine monitor (VMM) or other hypervisor. Using this model, the CSP is moved completely outside the trust boundary, with the VM (along with the agent) controlling its own execution. The agent is provided encrypted and is loaded remotely in the cloud. Using an embodiment to load the agent with integrity in the cloud can occur, while providing guarantees to the customer that the agent was indeed loaded with integrity.

In one implementation, Intel® Virtualization Technology (VT) and Trusted Execution Technology (TXT) are used in conjunction with a protected memory range inaccessible by the VMM (but originally accessible to TXT), or memory encryption technology such as Intel® Total Memory Encryption (TME), TME with Integrity (TMEi), Memory Encryption Engine (MEE) or Multi-Key Total Memory Encryption (MKTME). This embodiment removes the public cloud services provider's VMM/hypervisor code from the Trusted Code Base (TCB) of the guest VM/workload. These techniques protect the consumer's workload from access by the host VMM yet enable the host VMM to retain full control of the platform and manage guest virtual machines running on the platform.

Embodiments prevent exposure of consumer data contained within a guest virtual machine by protecting the consumer's data from access by the cloud services provider, by the host VMM, by other guest VMs, by administrators or others with physical access, by governments, and so on. The protection provided using techniques described herein effectively provides the same level of confidentiality and security as the consumer would have running the same workload in a private cloud (on premise). A mutual trust relationship is established between the consumer and the public cloud services provider by enabling the consumer to verify that the public cloud services provider's processes running in the cloud have not compromised the consumer's code and data. Similarly, the public cloud services provider is able to verify that the consumer's processes running in the cloud have not compromised the public cloud services provider's code and data.

FIG. 1 is a block diagram of a virtual machine environment 100 in accordance with one embodiment of the invention. In this environment, the concepts of a key domain and a domain manager are introduced. A key domain is a cryptographically separate portion of memory, where access to data stored in memory locations belonging to the key domain requires using an associated key domain key to decrypt the data. A domain manager may use a key domain to cryptographically separate data belonging to different owners; in a cloud services environment, a domain manager may use a key domain to cryptographically separate data belonging to different consumers of cloud services, such as banking services.

For example, in the virtualization environment 100 of FIG. 1, key domains KD1 $150_1$ and KD2 $150_2$ are used to separate data belonging to different virtual machines VM1 $130_1$ and VM2 $130_2$. The data belonging to each of virtual machines VM1 $130_1$ and VM2 $130_2$ may include, for example, consumer secrets (such as bank account numbers, social security numbers, etc.) belonging to each virtual machine VM1 $130_1$ and VM2 $130_2$. As another example, the data belonging to each of virtual machines VM1 $130_1$ and VM2 $130_2$ may include computer code (also referred to as a code image or simply an image) that is to be executed to protect each respective virtual machine's secrets within the cloud services provider's environment.

The respective domain managers (VMMlets $122_1$ and $122_2$) play a role similar to that of a virtual machine monitor (VMM, such as VMM 122 of FIG. 1) on behalf of their respective host owners VM1 $130_1$ and VM2 $130_2$. A domain manager (VMMlet) provides VMM functionality within a VM, rather than as a completely separate VMM layer as shown in FIG. 1. The domain manager (VMMlet) is privileged code having the ability to create, exit, and resume execution of VMs. These privileges may be referred to as "vmxroot" functionality, and include the ability to perform commands such as a VMCS save/restore, general purpose register (GPR) save/restore, and/or vmexit/vmresume. Furthermore, the domain manager (VMMlet) controls critical resources such as interrupt descriptor tables (IDT), advanced programmable interrupt controller (APIC) instructions, and paging data structures such as page tables and EPTs. In some embodiments, the domain manager (VMMlet) portion may include the data structures that control the VM, such as the VMCS, its associated data structures and the EPTs associated with the VM.

Referring again to FIG. 1, each of VM1 $130_1$ and VM2 $130_2$ is shown with its own domain manager (VMMlet) $122_1$ and $122_2$. Domain manager VMMlet1 $122_1$ is shown inside VM1 $130_1$, and domain manager VMMlet2 $122_2$ is shown inside VM2 $130_2$, to represent that code for each respective domain manager (VMMlet) is included within code for the respective VM. When a consumer requests services requiring virtualization, a code image implementing functionality of a domain manager (VMMlet) is provided by the cloud services provider to the consumer. The domain manager (VMMlet) image provided by the cloud services provider is incorporated into the consumer's domain (VM) image.

A consumer owning VM1 $130_1$ can measure and verify the domain manager (VMMlet) $122_1$ code before incorporating VMMlet1 $122_1$ into the consumer's domain (VM1 $130_1$) image. By placing the consumer's VM in control of the entire software stack of the consumer's VM image, including the domain manager (VMMlet), the consumer can measure, verify, and trust the image that is used to instantiate the domain manager (VMMlet) running within the consumer's VM. Finally, the consumer creates a domain launch image (including the domain manager image) that is memory position-dependent based on physical addresses, encrypts the domain launch image with the consumer's own key domain key, and provides the encrypted domain launch image to the cloud services provider server that will launch that domain launch image.

Referring again to FIG. 1, a processor (included in hardware 110) switches between VMs $130_1$ and $130_2$ and their respective key domains KD1 $150_1$ and KD2 $150_2$ using a switch key domain instruction in response to a command issued by memory manager 140. The result of switching from one key domain to another (e.g., from key domain KD2 $150_2$ to KD1 $150_1$) is that control over a particular physical memory alias is passed to a VM ($130_1$) that is authorized to access the current key domain KD1 $150_1$. Different hardware key domains accessed via key domain keys prevent information leaks of consumer private data across VMs and even by an adversary with access to the external physical memory manager 140. A key domain identifier/selector (e.g., part of the physical address) keeps VM memory regions separate in cache.

In one embodiment, a portion $112s$ of memory 112 is shared and is used to communicate across key domain cryptographic boundaries. In other words, the shared memory is not encrypted and can be used to communicate messages between VMs that otherwise can only access memory locations belonging to the key domain for which each particular VM is authorized. The shared memory is shown as having a physical address with a bit, described herein as a "k-bit," disabled. The k-bit is used to determine whether the current key domain is used to limit VM access to memory locations belonging to a key domain (such as one of key domains KD1 $150_1$ or KD2 $150_2$), or allow sharing unencrypted information across key domains in shared memory $112s$. The k-bit indicates to the CPU whether the key domain indicated in a physical address should be set to the shared key domain (plaintext/k) or to the currently active key domain (encrypted).

The above embodiment has been described with regard to a domain manager (VMMlet) that manages virtual machines, although the invention is not so limited. A similar key domain model can be used to support processes or containers; although there is no corresponding VMM, the OS kernel (or microkernel) serves a similar purpose. Each process or container image in each key domain will have cooperating OS kernel components (referred to herein as a domain manager or OSlet) that are measured by the cloud services provider. A domain manager (OSlet) responds to memory manager commands, interrupts, scheduling, resource management, etc., in a similar manner as the domain manager (VMMlet).

Figure 2:
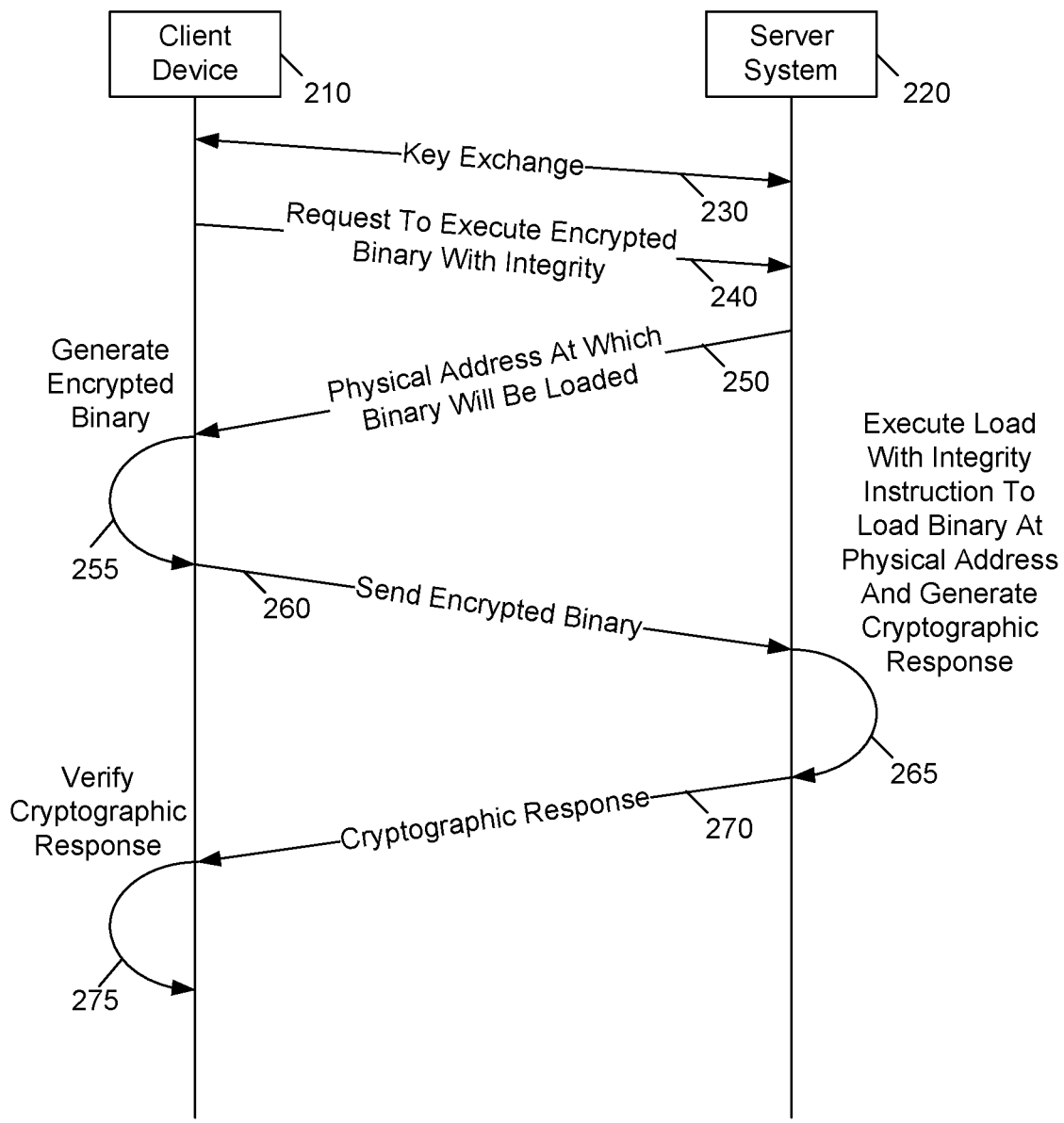
FIG. 2 is a flow diagram illustrating a high level view of a method in accordance with an embodiment of the present invention.

Referring now to FIG. 2, shown is a flow diagram illustrating a high level view of a method in accordance with an embodiment of the present invention. As shown in FIG. 2, method 200 is a method for interacting between a client and a server in accordance with an embodiment. More specifically, a client device 210 (hereafter "client 210") may be one or more client computing systems of a customer or tenant of a multi-tenant computing environment of which at least one server computing system 220 is a part. In method 200, client 210 seeks to provide an encrypted binary image to server computing system 220 for integrity protection and storage, to thereafter enable server computing system 220 or one or more other computing systems of the multi-tenant computing environment to execute the encrypted binary, e.g., within a protected domain such as a protected key domain associated with the tenant. In addition, server computing system 220 may provide a cryptographic response to indicate successful completion of the storage and integrity protection, to enable client system 210 to verify that the binary image was stored with integrity protection as requested.

As illustrated, method 200 begins via a key exchange process 230. Such key exchange process may be initiated in response to a request from client system 210 to server computing system 220 for secure binary storage. During this key exchange a plurality of keys may be exchanged to enable encryption of the binary image by client system 210 (or another client system of the tenant coupled thereto), and for use in generation and verification of a cryptographic response as described herein. As part of this key exchange, there can be more than one key shared between the customer and the server. Such keys may include a first key to be used for encrypting the binary in the cloud. A second key is exchanged to be used to generate and verify a cryptographic response. This cryptographic response is generated by the server hardware and verified by the customer to ensure that the binary is indeed being loaded with hardware integrity enforced.

Note that key exchange 230 between customer and server and its security can be done in multiple ways. As an example, an architectural Intel® Software Guard Extension (SGX) or other enclave trusted by both the customer and the CSP can be used for key exchange and securing the customer keys on the server. Additionally, other instructions (e.g., an EBIND instruction) can be used by this enclave to wrap keys and pass to the untrusted software stack on the server.

After key exchange process 230 completes, client 210 sends a request 240 to server computing system 220. In an embodiment, this request is a request for the multi-tenant computing environment to load and execute a binary (e.g., an agent image), namely an encrypted binary image, provide integrity protection to the image, and to enable execution of the encrypted binary by one or more authorized agents (e.g., a VM within a key domain associated with the tenant).

In response to request 240, server computing system 220 may allocate memory for the binary, and provide address information of the base of the region where the binary is loaded and send a message 250 back to client 210. In an embodiment, this message includes the physical address where the binary image is to be loaded. Although the scope of the present invention is not limited in this regard, in one embodiment this physical address is a starting address of a (e.g., contiguous) block in a system memory at which the binary image is to be stored. In an embodiment, client 210 may use this physical address of this destination location as a tweak value for purposes of encrypting the binary image (represented at element 255 in FIG. 2). In an embodiment, the customer encrypts the image using an Advanced Encryption Standard (XOR-encrypt-XOR)/XEX-based tweaked codebook mode with ciphertext stealing (AES-XTS) algorithm (as an example) with the physical address as the tweak and the encryption key. The physical address is used as the tweak to ensure that the same plaintext at different locations is encrypted differently to make frequency analysis harder.

Thereafter at block 260, client 210 sends the encrypted binary image to server computing system 220. In response to receipt of this encrypted image, server computing system 220 may execute a load with integrity (LDWINT) instruction in accordance with an embodiment. Via execution of this instruction (at element 265), server computing system 220 may access the encrypted binary image from a source location, generate at least one integrity value associated with the encrypted binary image, store the encrypted binary image at a destination location (e.g., corresponding to the physical address communicated from server computing system 220 to client system 210) and store the integrity value, e.g., in association with the encrypted binary image location. In a particular embodiment, server computing system 220 executes a given LDWINT instruction to load a page from a source location and copy it to a destination location (which is the original address that the server provided to the client in the handshake). To effect this operation, the MKTME engine is configured in the integrity only mode to copy the binary and generate integrity values on a per cacheline basis.

Still further via this instruction, server computing system 220 may generate a cryptographic response and, at block 270 send the cryptographic response back to client 210, which at element 275 may verify the cryptographic response, using one of the keys previously provided during the key exchange, to know that the binary has been loaded appropriately in the server. The instruction thus causes the encrypted image to be loaded to memory while generating the integrity values for the binary. Additionally, the instruction enables use of the key exchanged to generate a cryptographic response.

In one embodiment, untrusted CSP software executes this load with integrity instruction to load the customer image with integrity on the cloud platform. In an embodiment, the instruction has the following format:

LDWINT src_addr, dst_addr, crypt_rsp_struct
where:
  src_addr is the source address to load from;
  dst_addr is the destination address to load the image to; and
  crypt_rsp_struct is a cryptographic response structure required by this instruction (shown below in Table 1).

The instruction causes an image to be loaded from a source address and copied to a destination address, while signaling to the MKTME engine to generate integrity values for the encrypted image. Note that when the image is received in the cloud platform, the CSP software can copy the image at any address to begin with as long as it is just stored as data. On copying it out of this address (src_addr) to the destination address (dst_addr), it is installed at the correct address identified from CSP to be decrypted correctly. In an embodiment, before execution of this instruction, a KeyID associated with the destination address can be set up to ensure that the customer key is associated with the KeyID and the MKTME engine is configured in the integrity-only mode. An example implementation may use EBIND/UNWRAP instructions to program the MKTME engine with the key without revealing the customer key to the untrusted CSP software.

In turn, the instruction produces a cryptographic response using a key known only to the customer and the trusted software on the server platform (e.g., an architectural enclave). In order to do so, the instruction takes a cryptographic response structure as input. The structure is shown in Table 1 below.

TABLE 1

CRYPT_RSP_STRUCTURE

| Field | Description |
| --- | --- |
| Wrapped response key | Key to be used by the instruction to generate the cryptographic response |

TABLE 1-continued

CRYPT_RSP_STRUCTURE

| Field | Description |
|---|---|
| Cryptographic response | Cryptographic response generated by the instruction |

The response structure is both an input and an output structure. The invoking software passes the response key to use to generate the cryptographic response. In an embodiment, the key can be wrapped by the architectural enclave and passed to the untrusted software to use. The instruction unwraps the response key and uses it to generate a cryptographic response. The cryptographic response could be an authenticated encryption of a nonce exchanged between the customer and CSP as part of the original handshake. The response is then populated back in the cryptographic response field in this structure. This response is sent back to the customer. In turn the customer can verify that the LDWINT instruction was actually executed by the CSP software, as only the microcode for the LDWINT instruction can generate the response using the correct response key.

Considering that the binary to be loaded can be large and copying the binary to integrity-protected memory might take much longer than the maximum permissible latency of an instruction, an implementation may choose to architect this instruction to operate at 4 KB page granularity. If this is the case, multiple responses can be sent back to the customer. As part of the response, the starting physical address can also be included so the customer can verify that the binary was loaded correctly. In certain cases, a starting physical address at page granularity may be provided from the CSP to the customer for use in tenant encryption. Stated another way, encrypting and sending a page at a time between tenant and CSP may offer more flexibility to the CSP to load the binary discontiguously in memory. Understand while shown at this high level in the embodiment of FIG. 2, many variations and alternatives are possible.

Figure 3A:
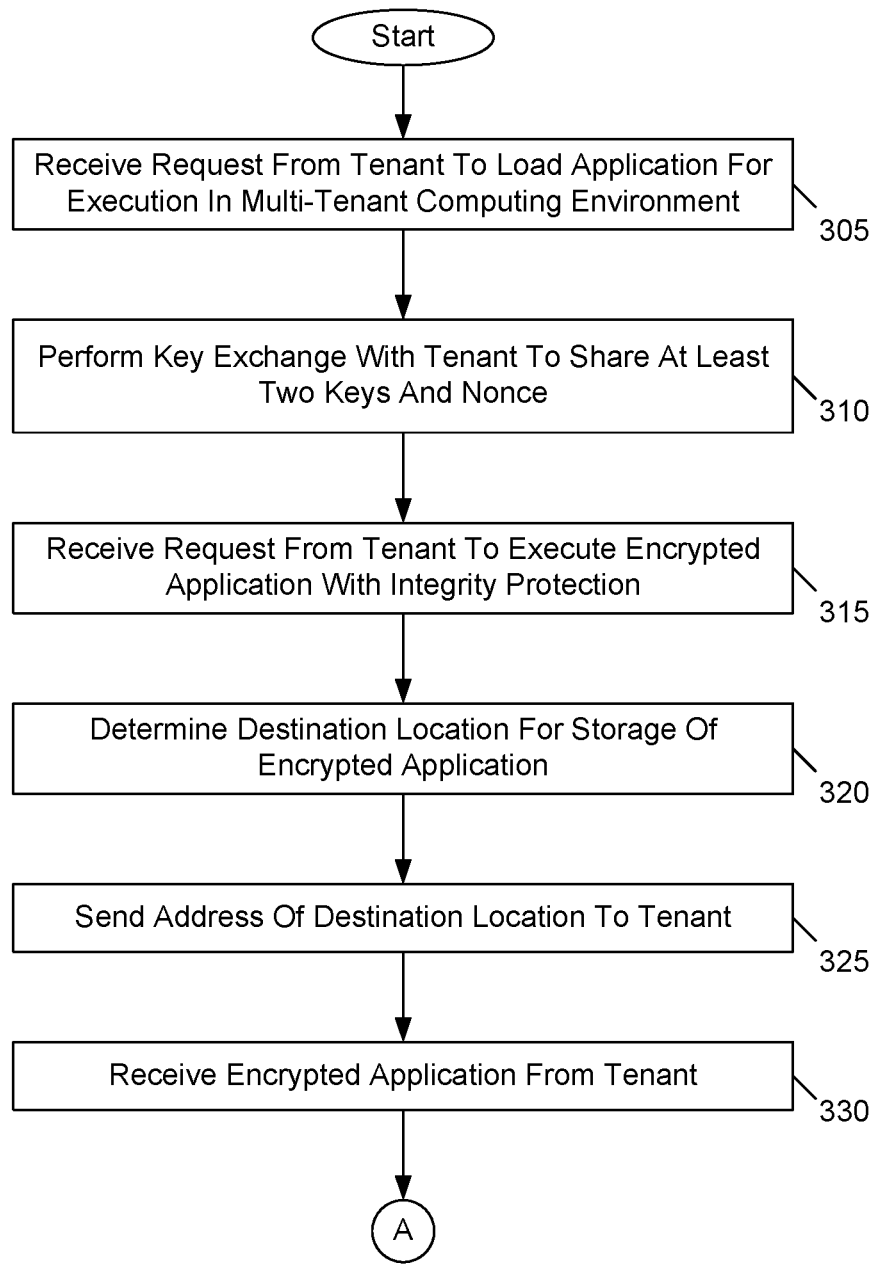
FIGS. 3A and 3B are flow diagrams in accordance with another embodiment of the present invention.
Figure 3B:
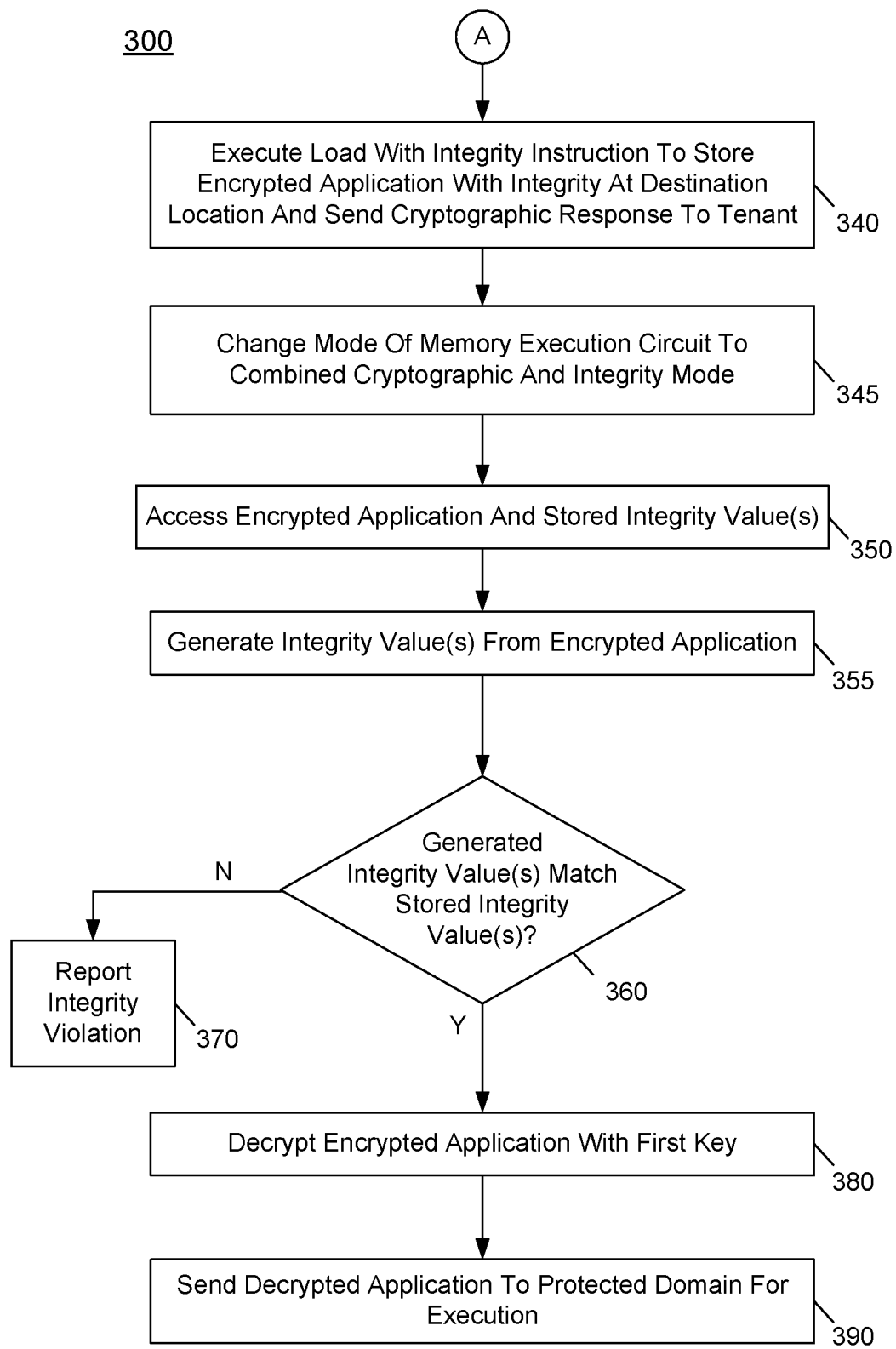

Referring now to FIGS. 3A and 3B, shown is a flow diagram in accordance with another embodiment of the present invention. As shown in FIG. 3A, method 300 is a method for loading an encrypted application, generating one or more integrity values based on the encrypted application, and storing the encrypted application with integrity for execution by an authorized agent. In embodiments, method 300 may be performed by hardware circuitry, firmware, software and/or combinations thereof. More specifically, method 300 may be performed within various components of a multi-tenant cloud computing environment including a plurality of hardware server computers, associated storage facilities and so forth.

As illustrated, method 300 begins by receiving a request (block 305). More specifically, this request is from a tenant of the multi-tenant computing environment (e.g., a client computing system of the tenant) for loading for a given application for execution in the multi-tenant computing environment. As one example, the application may be an application that is to securely execute, e.g., to perform a given workload. Note that for such operation, a memory execution circuit, e.g., a MKTME engine, may operate in an integrity-only mode so that it may apply integrity protection to this already encrypted application. To this end, configuration circuitry may update information in, e.g., one or more configuration registers associated with the memory execution circuit to enable this integrity-only mode of operation. That is, in typical environments, such memory execution circuit may generally operate in a combined encryption and integrity mode in which this memory execution circuit performs both encryption/decryption and integrity verification operations. In some cases, a processor may be placed into a protected mode of operation for such configuration register changes to be made. Or, such changes may be made using a trusted execution environment.

Control next passes to block 310 where a key exchange may be performed. More specifically, this key exchange between the remote server and the client computing device may be performed to generate one or more keys to be shared between the two entities. In a particular embodiment, at least two such keys may be generated, one for use in encryption/decryption, and the other for use in generating and evaluating cryptographic responses. In a particular embodiment, the key exchange at block 310 may be performed via a trusted execution environment (TEE) of the server computing system (and a similar trusted execution environment of the client computing device).

Next at block 315 a request is received from the tenant to execute an encrypted application with integrity protection. With this request, information associated with the application, such as its size, and other parameters such as a number of logical processors, memory reservation requirements and so forth, may be provided. At block 320, the multi-tenant computing environment may determine a destination location for storage of the encrypted application. Although the scope of the present invention is not limited in this regard in an embodiment, this determination may be based on available memory space and may correspond to a given address range, beginning at a first physical address.

Still with reference to FIG. 3A, next at block 325 the determined address of the destination location is sent to the tenant via a message. Thereafter at block 330 the encrypted application is received from the tenant. Note that this application is encrypted with one of the keys, namely the encryption key that is generated during the key exchange discussed above at block 310.

Control continues on FIG. 3B. As illustrated, at block 340 the client computing device may execute an instruction in accordance with an embodiment, namely a specialized load instruction, e.g., a load with integrity instruction. As described herein in an embodiment, this instruction may have three operands to identify source address information, destination address information and a cryptographic response structure. The source address is an indication of the location at which the encrypted application may be obtained (which may be a temporary storage of the remote server to which the encrypted application is directed on receipt from the tenant) and the destination address information is an indication of the beginning location for storage of the encrypted application (and which may correspond to a physical address of the destination location communicated from the remote server to the client system).

In addition to storage of the encrypted application responsive to the load with integrity instruction, at least one integrity value may be generated based on the encrypted application, e.g., at least one MAC value. In embodiments, there may be multiple MAC values stored in metadata associated with the encryption application, e.g., a MAC at cacheline granularity. For example embodiments may implement a low-overhead memory integrity solution by repurposing or otherwise utilizing ancillary bits (such as error-correcting code (ECC) bits) or other bits transmitted with data on the memory bus rather than requiring a separate fetch from additional storage to implement a MAC without incurring the operational overhead associated with a separate fetch.

In at least some embodiments, a MAC transmitted via such ancillary bits may be specially constructed in order to mitigate or prevent various classes of attacks, such as attacks that may be performed by one or more attackers with physical access to a multi-user system. As non-limiting examples, such attacks may include spoofing (in which an attacker is able to modify a cacheline in memory or over the memory bus); splicing (in which an attacker is able to swap cachelines between different physical locations); and cross-domain attacks (in which an attackers able to record ciphertext and/or a corresponding MAC of one user or VM and validly utilize it for another user or VM at a later time).

In some embodiments, memory execution circuitry can store a first MAC based on a first portion of (encrypted) data to be stored in system memory in response to a write operation to the system memory. A MAC as referred to herein can include any suitable message authentication code involving a cryptographic hash function and a secret cryptographic key. Non-exclusive examples of appropriate cryptographic MAC algorithms include NIST-approved algorithms (such as the SHA-3, SHA-1, SHA-2, and MD5 algorithms), although it will be appreciated that other cryptographic algorithms may be used In some embodiments, the memory execution circuitry can also detect a read operation corresponding to the first portion of data stored in the system memory and calculate a second MAC based on the first portion of data stored in the system memory. If the memory execution circuitry determines that the second MAC does not match the first stored MAC, it can raise an error to identify an integrity violation and potentially recalculate the second MAC. Furthermore, the memory execution circuitry device can decrypt the first portion of data in response to detecting the calculated second MAC matches the first MAC, and transmit the decrypted data to a core for execution, e.g., for a given key domain.

In addition and responsive to a load with integrity instruction, the remote server also may generate a cryptographic response. More specifically, using the additional key, namely the response key, the remote server may encrypt a given value such as a nonce communicated between the devices during the setup process (e.g., during the key exchange). Thereafter this cryptographic response is sent to the tenant. And as described herein, responsive to receipt of this cryptographic response, the client computing system may validate that the multi-tenant computing environment properly store the encrypted application with integrity.

Note that during the above operations, including the generation of these integrity values, a memory execution circuit (e.g., MKTME engine) may operate in an integrity-only mode. That is, since the received image is already encrypted, the memory execution circuit only generates integrity values and associates them with the image, e.g., on a cacheline basis as described herein.

Still with reference to FIG. 3B, thereafter the mode of the memory execution circuit may be changed to a combined cryptographic and integrity mode, e.g., by setting of appropriate values in one or more configuration registers (block 345).

Next at block 350, the encrypted application may be accessed along with the stored integrity values. In an embodiment, the memory execution circuit may be the accessor of these components. Next at block 355 one or more integrity values are generated from the encrypted application, e.g., a MAC value. Next it is determined whether the generated integrity value(s) matches the stored integrity value(s) (diamond 360). If not, an integrity violation may be reported (block 370). As an example, the memory execution circuit may report this integrity violation to the cloud service provider. In turn, the cloud service provider can communicate this violation to the tenant.

Still with reference to FIG. 3, assuming that the generated integrity value matches the stored integrity value, control passes to block 380 where the encrypted application may be decrypted with the first key (namely the encryption key provided during the key exchange process discussed above). Finally at block 390 the application as unencrypted may be sent to a given location, e.g., a protected domain of the tenant for execution. Understand while shown at this high level in the embodiment of FIGS. 3A-3B, many variations and alternatives are possible.

Figure 4:
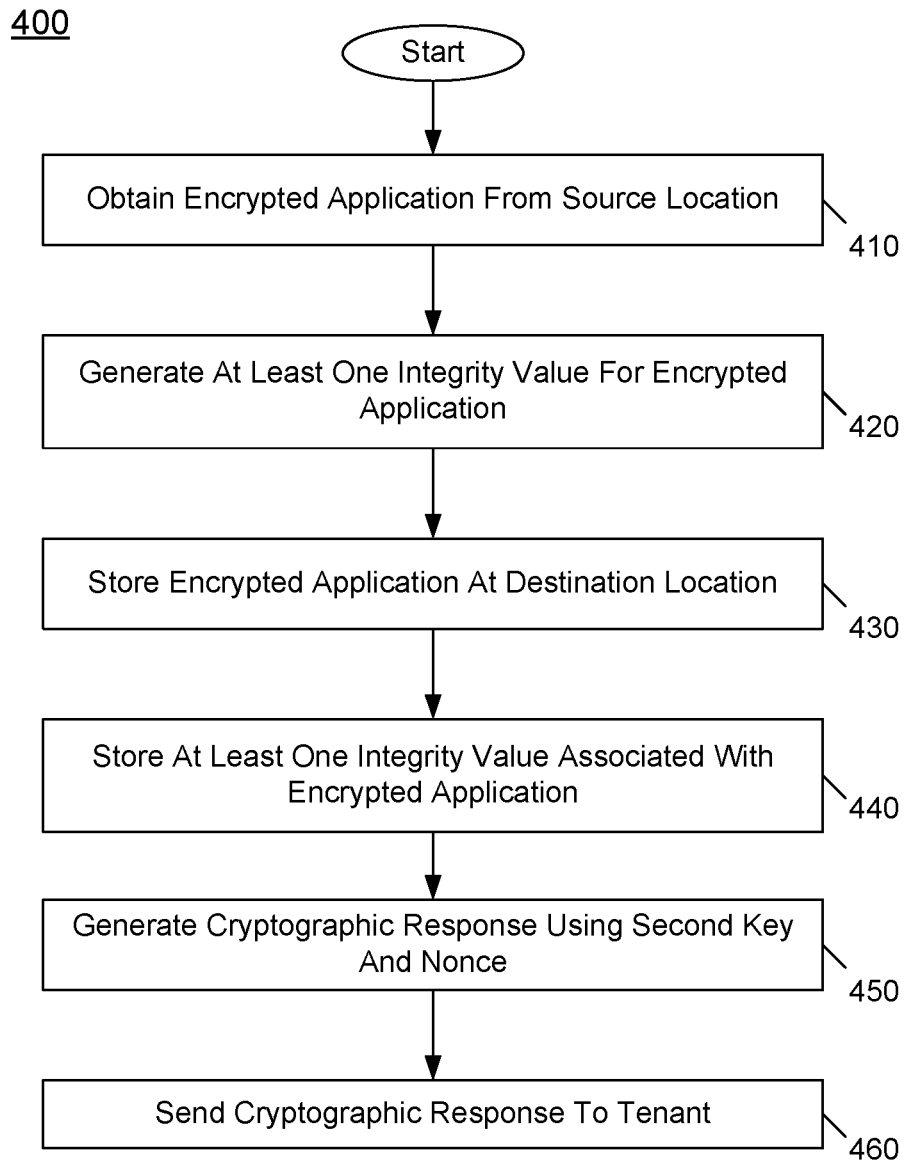
FIG. 4 is a flow diagram of a method in accordance with yet another embodiment of the present invention.

Referring now to FIG. 4, shown is a flow diagram of a method in accordance with yet another embodiment of the present invention. More specifically, method 400 shown in FIG. 4 is a detailed method for performing a load with integrity instruction in accordance with an embodiment. As such, method 400 may be performed by hardware circuitry, firmware, software and/or combinations thereof. More specifically, method 400 may be performed using both trusted and non-trusted hardware components to perform load operations, integrity operations, and cryptographic response generation.

As illustrated, method 400 begins by obtaining the encrypted application from a source location, namely the source location identified in a source operand of the instruction (block 410). Next at block 420 an integrity value is generated for the encrypted application. In a particular embodiment, a memory execution circuit may generate at least one MAC value for the encrypted application. More particularly, the memory execution circuit may generate a MAC value on a per cacheline width of data, per page width of data or so forth. Next at block 430, the encrypted application is stored in memory at a destination location corresponding to the physical address indicated in the destination operand of the instruction. At block 440 the integrity value may be stored at a second location. In an embodiment, this second location may be within a metadata field, e.g., in ECC data for a given data block.

Note that where the MAC data is stored in metadata associated with a cacheline, the MAC is fetched with the same memory access as the data line, thereby avoiding performance and bandwidth overheads associated with traditional integrity mechanism. In this way, embodiments avoid performance and bandwidth overheads. However this technique for storage of MAC data prevents visibility to software such as cloud service provider software. By using an embodiment herein that generates integrity values in response to a particular load instruction while a memory execution circuit is operating in an integrity only mode, an encrypted binary can be loaded with integrity and thereafter can be executed with integrity, even where the integrity values are not visible to cloud service provider software.

Still with reference to FIG. 4, at block 450 a cryptographic response is generated. More specifically, this cryptographic response may be generated using information in a cryptographic structure associated with the instruction. As discussed above, this cryptographic structure may include a response key (namely a second key as obtained during a key exchange process). Still further, this key may be used to encrypt a given value, e.g., a nonce communicated between the systems. Finally, at block 460 the cryptographic response is sent to a tenant system. Understand that the tenant system may inspect the cryptographic response, e.g., by decrypting the received response with its copy of the response key to validate that the multi-tenant computing environment in fact stored the encrypted application with integrity.

In embodiments, integrity-only mode for MKTME engine is enabled to allow the customer to provide an encrypted binary and load it to memory without any encryption, just generation of the integrity values. In the integrity-only mode, for a write request, an integrity value is generated on the data received without encrypting the data, as it is already encrypted. Similarly on a read, the data is integrity verified and returned to the requesting agent without decryption.

Figure 5:
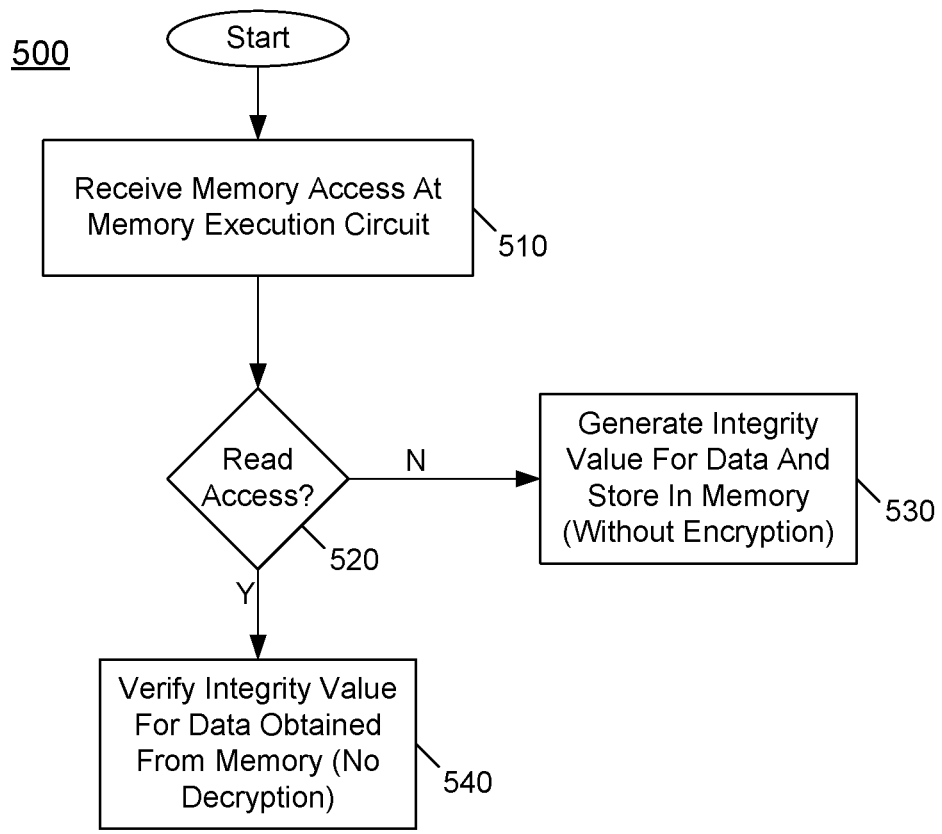
FIG. 5 is a flow diagram of a method in accordance with yet another embodiment of the present invention.

Referring now to FIG. 5, shown is a flow diagram of a method in accordance with yet another embodiment of the present invention. As shown in FIG. 5, method 500 is a method for operating a memory execution circuit in an integrity only mode. As such, method 500 can be performed by hardware circuitry, firmware, software and/or combinations thereof. More particularly, method 500 may be performed by a memory execution circuit of a processor that is configured to operate in an integrity only mode.

As illustrated in FIG. 5, method 500 may occur within the memory execution circuit in response to incoming memory accesses. Thus as seen, at block 510 an incoming memory access is received in the memory execution circuit. Next it is determined at diamond 520 whether the access is a read access. If not (i.e., the access is a write access), control passes to block 530 where an integrity value may be generated for incoming data of the access request, without encryption. As described herein, such integrity value may be a MAC that is generated within the memory execution circuit. This MAC value can be included within metadata of the data (e.g., a cacheline width of data, such as for storage within ECC bits of the cacheline). Although not shown in FIG. 5, understand that after generation and inclusion of this integrity value with the data, this integrity-protected data can be sent along for further handling to store the data with integrity protection in a given destination location, e.g., within a system memory.

Still with reference to FIG. 5, if instead the incoming memory access is a read access, control passes to block 540 where the requested data (e.g., at a cacheline width) may be obtained from a given location (e.g., from system memory). At block 540 an integrity value for the data obtained may be verified. To this end, an integrity value for the data can be calculated (e.g., according to a given MAC technique). In turn, this generated integrity value can be compared to a stored integrity value associated with the data (e.g., as obtained from metadata associated with the data, such as from ECC bits as described herein). If it is determined that these two values match, namely the computed integrity value matches the stored integrity value, integrity of the data is verified. As such, the memory execution circuit may decrypt the encrypted data, e.g., using the encryption key shared by the customer to decrypt the data and send it along, to a given key domain associated with the customer. Note that in other cases it is possible for the memory execution circuit to perform an integrity-only verification and then send encrypted data to a requester to allow the requester to decrypt the data. In such embodiments, this requester may be a VM or other agent in execution in a key domain. It is within this key domain that the data may be decrypted and used.

With reference back to the verification determination of block 540, if instead verification does not succeed (where the computed integrity value does not match the stored integrity value), an integrity violation may be raised. Note that the memory requests are in response to a core's request to read memory to execute a tenant binary or to load/store data associated with the code. As such, the integrity violation is sent back to the core, which can handle it by terminating the VM receiving the error, as an example. Understand while shown at this high level in the embodiment of FIG. 5, many variations and alternatives are possible.

Embodiments may control operating mode of the MKTME engine based on information stored in one or more configuration registers. In some embodiments, for example, control registers such as model-specific registers (MSRs) may include a memory encryption capability register and a memory encryption activation register. In a particular embodiment, an IA32_TME_CAPABILITES MSR may be used to enable software to discover the memory encryption capabilities such as supported encryption types and/or algorithms, the maximum number of encryption keys that can be used concurrently, whether integrity-only mode is available on the platform and so forth. In turn, an IA32_TME_ACTIVATE MSR can be used to activate the protection. Details of such registers in accordance with an embodiment are shown below in Tables 2 and 3, respectively.

TABLE 2

IA 32_TME_CAPABILITY MSR

| Bit fields | MSR/Bit Description | Comment |
|---|---|---|
| 0 | AES-XTS 128 bit encryption algorithm | |
| 1 | AES-XTS 256 bit encryption | |
| 2 | AES-XTS 128 bit encryption algorithm with integrity | |
| 3 | AES-XTS 256 bit encryption with integrity | |
| 4 | Integrity-only mode | |
| 5:15 | Reserved | For encryption algorithms |
| 16:31 | Reserved for future TME usage | |
| 32:35 | Zero if MK-TME is not enumerated NUM_KEYS: Maximum number of encryption keys supported = 2^NUM_KEYS. Number of Physical Address (PA) bits that can be used as encryption key identifiers in the initial implementation. | Example: for 256 keys, this field would report a value of 8. |
| 36:63 | Reserved | |

TABLE 3

IA32_TME_ACTIVATE MSR

| Bit fields | MSR/Bit Description | Comment |
|---|---|---|
| 0 | Lock RO - Will be set upon successful WRMSR (Or first SMI) | |
| 1 | TME Enable RWL - Enable Total Memory encryption using CPU generated ephemeral key based on hardware random number generator | |
| 2 | Key select 0 - Create a new key (expected cold/warm boot) 1- Restore the key from storage (Expected when resume from standby) | |

TABLE 3-continued

IA32_TME_ACTIVATE MSR

| Bit fields | MSR/Bit Description | Comment |
|---|---|---|
| 3 | Save key for standby - Save key into storage to be used when resume from standby | |
| 4:7 | TME policy/encryption algorithm Only algorithms enumerated in IA32_TME_CAPABILITY are allowed For example: 0000 - AES-XTS-128 Other values are invalid | TME Encryption algorithm to be used (No changes - highlighted to show the field used to enable integrity-only mode) |
| 8:31 | Reserved | |
| 32:35 | Reserved if MK-TME is not enumerated The number of KEYID/Physical Address bits to configure/allocate towards MK-TME (Just as with enumeration, this is an encoded value). | Example: for 256 keys, this field would be set to a value of 8. |
| 36:47 | Reserved | |
| 48:63 | Reserved if MK-TME is not enumerated Bitmask for BIOS to restrict which encryption algorithms are allowed for MK-TME, would be later enforced by the key loading ISA | Applied if bits 1:15 non-zero in Capability MSR (no changes, highlighted to show the field used to enable integrity-only mode for MKTME KeyIDs) |

In an embodiment, a platform configuration (PCONFIG) instruction can be used to program the MKTME engine. In an embodiment, the PCONFIG instruction is invoked by software for managing the keys/protection for a domain using the MKTME engine. PCONFIG supports multiple leafs and a leaf function is invoked by setting the appropriate leaf value in an EAX registers. RBX, RCX, and RDX registers may have a leaf-specific purpose. In an embodiment PCONFIG currently only supports one leaf, KEY_PROGRAM, which is used to manage the key associated with a domain. The KEY_PROGRAM operation works using the KEY_PROGRAM_STRUCT. Table 4 shows a KEY_PROGRAM_STRUCT in memory used by PCONFIG instruction to bind a key to a KeyID in accordance with an embodiment of the present invention.

TABLE 4

KEY_PROGRAM_STRUCT

| Field | Offset (bytes) | Size (bytes) | Comments |
|---|---|---|---|
| KEYID | 0 | 2 | Key Identifier |
| KEYID_CTRL | 2 | 4 | KeyID control: Bits [7:0]: COMMAND Bits [23:8]: ENC_ALG Bits [31:24]: RSVD, MBZ |
| RSVD | 6 | 58 | RSVD, MBZ |
| KEY_FIELD_1 | 64 | 64 | Software supplied KeyID data key or entropy for KeyID data key |
| KEY_FIELD_2 | 128 | 64 | Software supplied KeyID tweak key or entropy for KeyID tweak key |

In an alternate embodiment, assume that a customer seeks to load and execute its VM on a cloud server with integrity. A VMM can load the original client encrypted VM image via bypass, this is the boot loader image, the image is encrypted in a MKTME key configured without integrity. The only purpose of this image is to load data from the encryption only KeyID and write it back using a second KeyID configured with integrity. This way software can check the original client provided integrity values while establishing the first memory integrity image.

Figure 6:
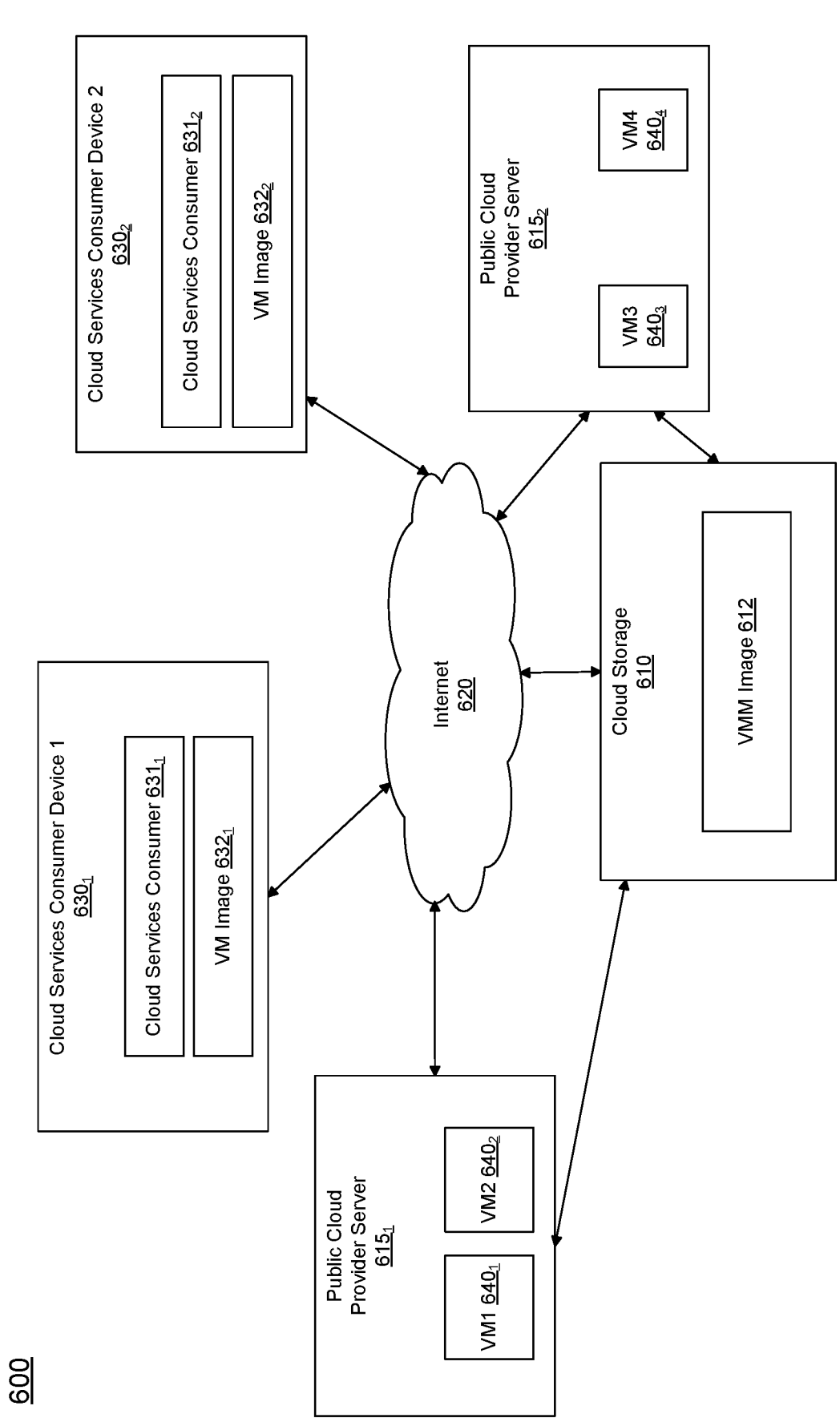
FIG. 6 is a block diagram of a cloud services environment in accordance with an embodiment of the present invention.

Referring now to FIG. 6, shown is a block diagram of a cloud services environment in accordance with an embodiment of the present invention. As shown in FIG. 6, a network 600 can be used to allow consumers to request services, including virtualization services, from a public cloud services provider. As seen, network 600 can correspond to any type of communications network and can include many different types of computing devices interconnected via a given network such as Internet 620.

Cloud storage 610 can be provided as part of a data center that includes various computing devices, storage devices and so forth. As one example, cloud storage 610 can be a storage device that includes multiple storage components such as disks, optical, or semiconductor-based storage. Cloud storage 610 can act, for example, as a repository of master copies of various applications, including a VMM application that instantiates virtual machines to provide services in response to a consumer's request. In the embodiment shown in FIG. 6, a master copy of a VMM application is stored in the form of a VMM image 612. VMM image 612 is a software image containing a software stack designed to provide a virtual machine platform in the form of a VMM.

Thus as further seen in FIG. 6, at the same location, e.g., as part of the same data center, one or more public cloud services provider servers, such as public cloud provider servers $615_1$ and $615_2$ can be coupled to cloud storage 610. In various embodiments, public cloud services provider servers can be used to service consumer services requests, including virtualization requests. For example, each public cloud services provider server may host one or more virtual machines on behalf of a consumer. In the example shown in FIG. 6, public cloud provider server $615_1$ hosts two virtual machines, VM1 $640_1$ and VM2 $640_2$. Similarly, public cloud provider server $615_2$ hosts two virtual machines, VM1 $640_3$ and VM2 $640_4$.

As shown in FIG. 6, various consumer devices can be present, e.g., cloud services consumer devices $630_1$ and $630_2$. Such cloud services consumer devices may be personal devices of a given user such as a smartphone, tablet computer, desktop computer or so forth. Alternatively, cloud services consumer devices may be servers for an organization that consumes cloud services. In addition, cloud services consumer devices may be emulated via software.

Each of cloud services consumer devices $630_1$ and $630_2$ provides a respective cloud services consumer $631_1$ and $631_2$ and a respective VM image $632_1$ and $632_2$. Cloud services consumers $631_1$ and $631_2$ may be, for example, a client component of a cloud services application used to request cloud services. VM images $632_1$ and $632_2$ may be stored in storage (not shown) coupled to the respective cloud services consumer devices $630_1$ and $630_2$. These VM images are provided by the consumer to the cloud services provider and used to create a secure VM, such as VM1 $640_1$, running on the cloud provider's server $615_1$.

As described herein, such VM images may be sent to the cloud services provider in an encrypted manner, responsive to a key exchange between the entities. Thereafter, a given one of servers 615 may use a memory execution circuit operating in an integrity-only mode to apply integrity protection to such secure VM, prior to its storage in cloud storage 610. Still further, upon access to the VM, this same memory execution circuit may verify integrity based at least in part on this integrity protection information and, when verified, decrypt the VM image and enable execution in a given one of public cloud provider servers 615. Understand while shown at this high level in the embodiment of FIG. 6, many variations and alternatives are possible.

Figure 7:
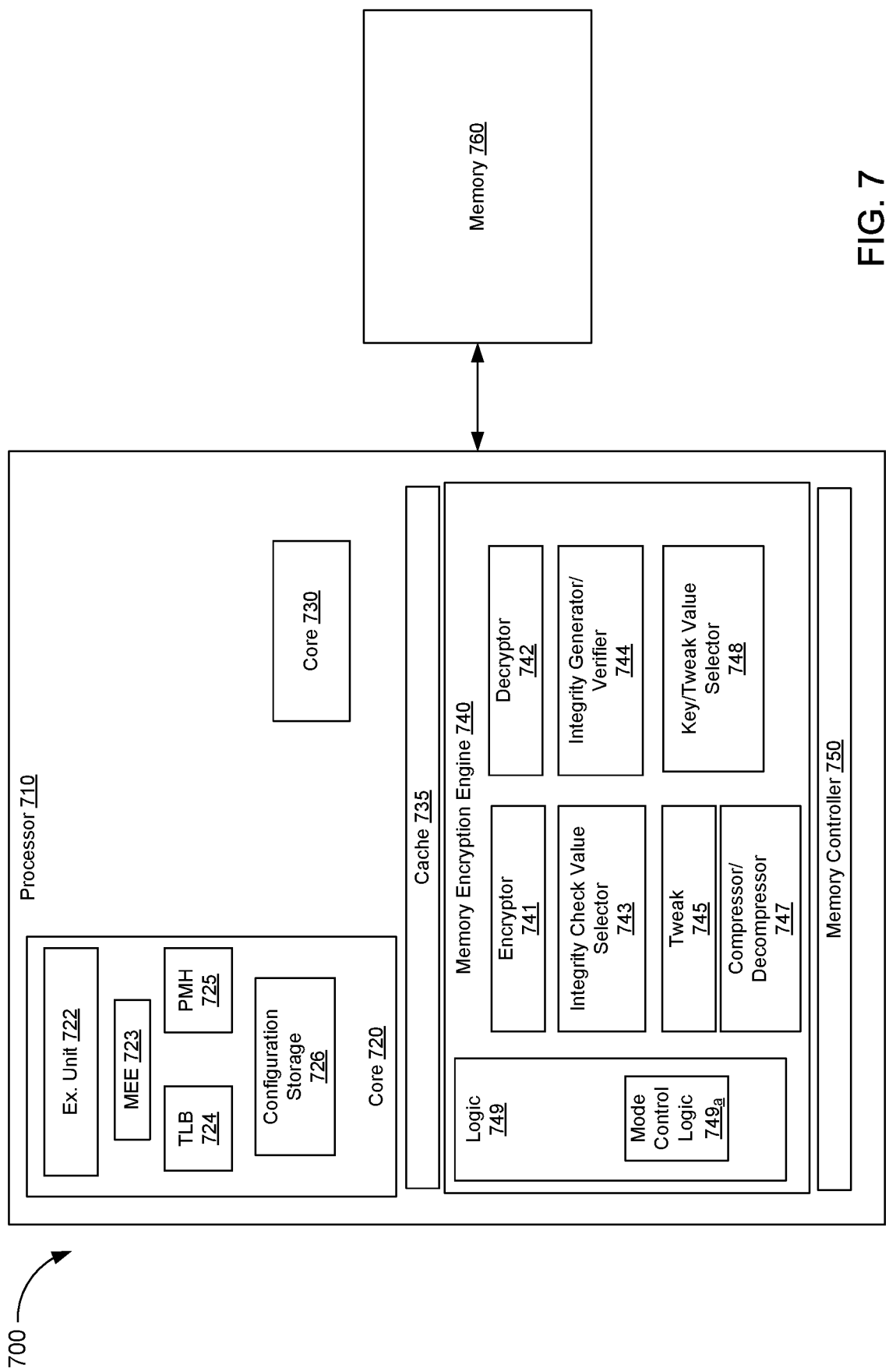
FIG. 7 is a diagram showing an apparatus in accordance with one embodiment of the invention.

FIG. 7 is a diagram showing an apparatus in accordance with one embodiment of the invention, which may be an apparatus 700 to secure a public cloud environment according to an embodiment. Apparatus 700 may include any computing device and/or data platform ranging from laptop, personal digital assistant (PDA), media content player, imaging device, mobile Internet device (MID), any smart device such as a wireless smart phone, smart tablet, smart TV, server computer, and so on, or combinations thereof.

Apparatus 700 includes a memory 760. Memory 760 may be external to a processor 710 (e.g., external memory), and/or may be coupled to processor 710 by, for example, a memory bus. In addition, memory 760 may be implemented as main memory. Memory 760 may include, for example, volatile memory such as DRAM, non-volatile memory, and so on, or combinations thereof.

Memory 760 may be protected using encryption and integrity checking. In one embodiment, a tweakable block cipher encryption technique is used. A tweakable block cipher accepts a second input, called a tweak, along with plaintext or ciphertext input to be decrypted. The tweak, along with the key, selects the permutation computed by the cipher. For example, a tweak function may use a physical memory address as a tweak to a block cipher to bind unencrypted data with the physical memory address. A tweak function 745 may include, for example, AES-XTS algorithm, Liskov, Rivest, and Wagner (LRW) algorithm, and so on, or combinations thereof.

Note that in embodiments herein, such encryption and integrity checking may be realized by a hybrid approach in which a consumer (e.g., tenant) performs encryption operations and hardware of the multi-tenant computing environment performs the integrity protection, as described herein. Also understand that such integrity protection is provided in a manner in which this integrity protection is not visible to untrusted software such as CSP software of the multi-tenant computing environment. Thus in integrity only modes of operation as described herein, such encryption operations may not be performed with an encryptor 741 or any other circuitry within memory encryption engine 740. Instead, when system 700 is implemented as part of a multi-tenant computing environment, encryption of a received binary image or other data structure may already have been performed by a given consumer or tenant of the multi-tenant computing environment. System 700 thus decrypts the binary to execute on a given core. Hence before executing such binary, operation switches to a combined integrity and encryption/decryption mode which will decrypt naturally on reads from memory along with verifying the integrity of data/code loaded.

Processor 710 may include any type of processor such as, for example, micro-processor, an embedded processor, a digital signal processor (DSP), a central processing unit (CPU), a graphical processing unit (GPU), a visual processing unit (VPU), a network processor, a device to execute code to implement the technologies described herein, and so on, or combinations thereof. Processor 710 may include one or more cores such as, for example, a core 720 and a core 730. Cores 720, 730 may include a single-threaded core, a multithreaded core including more than one hardware thread context (or "logical processor") per core, and so on, or combinations thereof. Cores 720, 730 may include an instruction decoder to recognize and/or decode an instruction (e.g., from an instruction register), to activate appropriate circuitry to execute the instruction, to verify that a stream of instructions (e.g., operation codes, etc.) will compute, and so on, or combinations thereof.

Representative details of core 720 are illustrated. Understand that core 730 and/or other present cores may include similar circuitry. As seen, core 720 includes one or more execution units 722 such as floating point and/or vector execution units. In addition, core 720 includes a memory execution engine 723 which may perform operations as described herein, in some embodiments. In other cases, operations described herein may be performed using a memory encryption engine 740 (also referred to herein as a "memory execution circuit").

In any event as further illustrated in FIG. 7, core 720 includes a TLB 724. In various embodiments, TLB 724 includes entries each having a translation from a linear address to a physical address. In some embodiments entries within TLB 724 also may include a KeyID (or a portion thereof) for use in maintaining isolation between different VMs (e.g., of the same or different consumers having VMs to execute in the multi-tenant computing environment). A page miss handler 725 may, when a translation for a given linear address is not included in TLB 724, perform a page walk of page tables (which may be stored in memory 760) to obtain a physical address (and possibly KeyID information).

As further illustrated, core 720 includes a configuration storage 726. In embodiments herein, configuration storage 726 may include a set of configuration registers and/or MSRs, including one or more registers to store information associated with configuring of MEE 723 and/or memory encryption engine 740. More particularly as described herein, such configuration registers may enable memory encryption engine 740 to operate in a given one of multiple modes, including a combined encryption/integrity mode and/or an integrity only mode. Note that while configuration storage 726 is shown as included in core 720, in other cases, at least configuration registers for a memory execution circuit such as memory encryption engine 740 may be included in another portion of processor 710.

Processor 710 may include internal storage such as, for example, a processor cache 735 including one or more levels to store data (e.g., instructions, operands, program data, etc.) utilized by one or more components of processor 710. Cache 735 may not be encrypted and/or may share a same die as processor 710, on the same chip. In addition, the processor cache may be integrated onto one or more of cores 720, 730, as described above. Cores 720, 730 may check whether data is located in cache 735 to execute one or more instructions and/or other data (e.g., program data, etc.).

Each core 720, 730 may be, for example, coupled with respective memory via a respective memory controller such as a memory controller 750, coupled with shared memory via a shared memory controller, coupled with respective memory via a shared memory controller, and so on, or combinations thereof. In addition, a shared cache may be coupled with a shared memory controller, a plurality of caches may be coupled with a plurality of respective memory controllers, and so on, and combinations thereof. For example, memory controller 750 may be shared among cores 720, 730, may be coupled with cache 735 (e.g., shared multilevel cache), and may couple cores 720, 730 with memory 760 (e.g., shared DRAM). The memory controller 750 may be coupled with memory 760 (e.g., external memory, DRAM, etc.).

Processor 710 also includes memory encryption engine 740. The illustrated memory encryption engine 740 includes an encryptor 741, which may encrypt unencrypted data. The unencrypted data may include, for example, cleartext data, plaintext data, and so on, or combinations thereof. Encryptor 741 may include any type of cipher to generate ciphertext data such as, for example, a block cipher in any desired mode of operation. The block cipher may include a fixed block size, wherein the block cipher may be repeatedly implemented to encrypt data larger than the block size. For example, the block cipher may include AES in a propagating cipher-block chaining (PCBC) mode of operation. In addition, the block cipher may include an expandable block size.

Memory encryption engine 740 also includes a decryptor 742, which may decrypt ciphertext data to generate unencrypted data. Decryptor 742 may include an inverse of encryptor 741. For example decryptor 742 may include an inverse of AES-PCBC. Thus, unencrypted data (e.g., plaintext data) may be implemented as input to encryptor 741 to generate an unreadable copy of the unencrypted data (e.g., ciphertext data) when the unencrypted data is to be stored in memory 760 (e.g., write instruction), where decryptor 742 may be implemented to decrypt the ciphertext data and generate the unencrypted data when the ciphertext data is to be fetched from memory 760 (e.g., read instruction), in cases where memory encryption engine 740 is configured for a mode in which it is to perform encryption/decryption operations.

Memory encryption engine 740 may read an encrypted data line and decryptor 742 may decrypt the encrypted data line, in a mode in which it is configured to perform such encryption/decryption.

As further illustrated, memory encryption engine 740 further includes an integrity generator/verifier 744 which may perform integrity operations as described herein, including in cases in which memory encryption engine 740 is configured in an integrity only mode. In such cases, integrity generator/verifier 744 may generate integrity values such as MAC values and may store them, e.g., in metadata such as ECC metadata associated with cachelines, to reduce performance and storage impacts. Upon obtaining data from system memory 760, an integrity value may be generated and then verified by comparison to a stored integrity value. As such, integrity verifier may include a comparator to identify whether a match between the generated and stored integrity values occurred for a given (e.g., encrypted data line) when in an integrity only mode. Memory encryption engine 740 may also include a compressor/decompressor 747 to compress/decompress the data line bytes.

Memory encryption engine 740 may further include a key/tweak value selector 748 to select a key from a plurality of keys (e.g., a key domain) and/or a tweak from a plurality of tweaks (e.g., a tweak domain) for a physical location in memory 760, when in a combined encryption/integrity mode. For example, the illustrated memory encryption engine 740 may include a function detector to determine that a function (e.g., a program, middleware, an operating system, firmware, virtual machine, VMM, OS kernel, etc.) or a part of the function (e.g., part of a program, etc.) is being launched for the first time, or is being given access to a physical location in the memory 760 for the first time. Key/tweak value selector 748 may, in response, select a key and/or a tweak for the physical location in the memory when the function (and/or part thereof) is given access.

Memory encryption engine 740 also includes logic 749, which may utilize components of processor 710 such as, for example, cores 720, 730, encryptor 741, decryptor 742, etc., to maintain (e.g., ensure, verify, test, etc.) the security and integrity of memory 760. And as shown in FIG. 7, logic 749 may include a mode control logic 749a which may, based at least in part on information present in configuration storage 726, control a mode of operation of memory encryption engine 740 to be in a given mode, e.g., one of the integrity only and encryption/integrity modes described herein. Although not illustrated in FIG. 7, the apparatus 700 may include other elements on chip with the processor 710. For example, processor 710 may include input output (IO) control logic integrated with memory encryption engine 740. Additionally, while examples have shown separate components for illustration purposes, it should be understood that one or more of the components of apparatus 700 may be combined, may reside in the same and/or different physical and/or virtual locations, and so on, or combinations thereof.

Embodiments thus may be used in a multi-tenant cloud computing environment to secure public cloud facilities using hardware. For example, cloud customers (tenants/consumers) may desire that their workloads be secure in a public cloud infrastructure. The techniques described herein may enable tenants/consumers to be protected from hacking, physical access, administrators, privileged software and the cloud provider itself.

In addition, embodiments enable cryptographic isolation for CSP customer workloads (tenants/domains), to enable removal of CSP software from a customer's TCB. Note that embodiments can be applied to any DRAM, or SCM-based memory, like NV-DIMM-N. In this way, disk encryption software can work with NVDIMMs in a direct access storage (DAS) mode for SCM. As such, software/applications may take advantage of performance benefits of NVDIMM DAS mode for SCM without compromising platform security requirements, and while meeting security requirements for CSPs.

Embodiments also provide a technical advance in that prior integrity solutions relied on storing MACs in sequestered memory which being a part of the system address space can be made accessible to software. With the hybrid approach described herein, tenants can provide encrypted binaries without associated MACs and cloud software, via trusted hardware, can generate MACs and store them in metadata of ECC memories reducing overhead, even though such MAC metadata is not software visible.

The following examples pertain to further embodiments.

In one example, an apparatus comprises: a core to execute instructions, where in response to a first instruction, the core is to obtain a binary of a requester from a source location and store the binary to a destination location, the binary comprising an encrypted image; and a memory execution circuit coupled to the core. The memory execution circuit, in response to a request from the core and based on the first instruction, may be configured to generate at least one integrity value for the binary and store the at least one integrity value in association with the binary, the at least one integrity value inaccessible to a non-trusted entity.

In an example, the core, in response to the first instruction and after the storage of the binary and the at least one integrity value, is further to generate a cryptographic response using a first key shared between the apparatus and the requester and send the cryptographic response to the requester to enable the requester to validate that the binary was stored to the destination location with the integrity protection.

In an example, the first instruction comprises a load with integrity instruction, the load with integrity instruction to identify the source location, the destination location and a structure identifier to identify a structure including the first key and the cryptographic response.

In an example, the first key is wrapped to prevent the non-trusted entity from access to the first key.

In an example, the binary is encrypted using address information associated with the destination location, the apparatus to send the address information to the requester to enable the requester to encrypt the binary to form the encrypted image, the requester comprising a tenant of a multi-tenant computing environment including the apparatus.

In an example, the apparatus, in response to a request by the requester for integrity protection of the binary, is to send the address information associated with the destination location to the requester, to enable the requester to encrypt the binary using a second key and the address information.

In an example, the apparatus further comprises a configuration register having a first field to store an integrity indicator which, when in an active state, is to cause the memory execution circuit to operate in an integrity only mode.

In an example, the integrity indicator is to be in an active state when the memory execution circuit is to generate the at least one integrity value for the binary and store the at least one integrity value in association with the binary.

In an example, after execution of the first instruction, the core is to update the integrity indicator to an inactive state to cause the memory execution circuit to operate in a combined encryption and integrity mode.

In an example, in the combined encryption and integrity mode, the memory execution circuit is to access a first portion of the binary from the destination location, generate a generated integrity value for the first portion of the binary, compare the generated integrity value to the at least one integrity value for the binary, and in response to a match, decrypt and provide the first portion of the binary to a key domain associated with the requester for execution.

In an example, the memory execution circuit is to store the at least one integrity value in a metadata field of a data block of the binary.

In another example, a method comprises: receiving, from a requester, a request to load an encrypted application for execution in a protected domain of at least one server of a cloud service provider; in response to the request, determining a destination location in a memory of the cloud service provider at which the encrypted application is to be stored; sending an address of the destination location to the requester, wherein the requester is to encrypt the encrypted application using a first key and the address of the destination location; receiving the encrypted application from the requester and applying integrity protection information to the encrypted application; storing the encrypted application with the integrity protection information at the destination location; generating a cryptographic response using a second key to confirm that the encrypted application was stored at the destination location with the integrity protection information; and sending the cryptographic response to the requester.

In an example, the method further comprises executing the encrypted application in the protected domain of the at least one server in response to determining, based at least in part on the integrity protection information, that the encrypted application was not modified while stored in the memory.

In an example, the method further comprises executing, via untrusted code of the cloud service provider, a load with integrity instruction to cause the encrypted application to be stored with the integrity protection information.

In an example, executing the load with integrity instruction comprises: sending the encrypted application to a memory execution circuit of a processor of the at least one server to apply the integrity protection information to the encrypted application, where the memory execution circuit is to operate in an integrity only mode to apply the integrity protection information, wherein the integrity protection information is not visible to the untrusted code.

In an example, the method further comprises performing a key exchange between the requester and the cloud service provider to share the first key and the second key.

In an example, the method further comprises: sending the encrypted application with the integrity protection information from the destination location to the memory execution circuit to verify the integrity protection information; and in response to verifying the integrity protection information, decrypting the encrypted application with the first key and sending the unencrypted application to the protected domain.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a multi-tenant computing system comprises at least one processor including: a plurality of cores on which a plurality of agents of a plurality of tenants of the multi-tenant computing system are to execute; a configuration storage including a first configuration register to store configuration information associated with a memory execution circuit, the first configuration register to store a mode identifier to identify a mode of operation of the memory execution circuit; and the memory execution circuit, in a first mode of operation, to receive encrypted data of a first tenant of the plurality of tenants, the encrypted data encrypted by the first tenant, generate an integrity value for the encrypted data and send the encrypted data and the integrity value to a memory, where the integrity value is not visible to software of the multi-tenant computing system. The system may further include the memory coupled to the at least one processor, the memory to store the encrypted data and the integrity value.

In an example, a first core of the plurality of cores is to execute a first instruction to obtain the encrypted data from a source location identified in the first instruction, store the encrypted data to a destination location of the memory identified in the first instruction, and generate a cryptographic response for the encrypted data, the cryptographic response having a response value comprising a nonce encrypted with a first key, where the nonce and the first key are shared between the multi-tenant computing system and the first tenant prior to delivery of the encrypted data to the multi-tenant computing system from the first tenant, the multi-tenant computing system to send the cryptographic response to the first tenant.

In an example, when the mode identifier is to identify an integrity only mode, the memory execution circuit is to generate an integrity value for write data but not to encrypt the write data.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a core to execute instructions, wherein in response to a first instruction, the core is to obtain a binary of a requester from a source location and store the binary to a destination location, the binary comprising an encrypted binary image, wherein the core is to send a physical address associated with the destination location to the requester to enable the requester to encrypt a binary image using the physical address to generate the encrypted binary image; and
a memory execution circuit coupled to the core, the memory execution circuit, in response to a request from the core and based on the first instruction, to generate at least one integrity value for the binary comprising the encrypted binary image, store the encrypted binary image at the destination location corresponding to the physical address, and store the at least one integrity value in association with the encrypted binary image, the at least one integrity value inaccessible to a non-trusted entity.

2. The apparatus of claim 1, wherein the core, in response to the first instruction and after the storage of the binary and the at least one integrity value, is further to generate a cryptographic response using a first key shared between the apparatus and the requester and send the cryptographic response to the requester to enable the requester to validate that the binary was stored to the destination location with integrity protection.

3. The apparatus of claim 2, wherein the first instruction comprises a load with integrity instruction, the load with integrity instruction to identify the source location, the destination location and a structure identifier to identify a structure including the first key and the cryptographic response.

4. The apparatus of claim 2, wherein the first key is wrapped to prevent the non-trusted entity from access to the first key.

5. The apparatus of claim 1, wherein the requester comprises a tenant of a multi-tenant computing environment including the apparatus.

6. The apparatus of claim 1, wherein the apparatus, in response to a request by the requester for integrity protection of the binary, is to send the physical address associated with the destination location to the requester, to enable the requester to encrypt the binary using a second key and the physical address to generate the encrypted binary.

7. The apparatus of claim 1, further comprising a configuration register having a first field to store an integrity indicator which, when in an active state, is to cause the memory execution circuit to operate in an integrity only mode.

8. The apparatus of claim 7, wherein the integrity indicator is to be in the active state when the memory execution circuit is to generate the at least one integrity value for the binary and store the at least one integrity value in association with the binary.

9. The apparatus of claim 8, wherein after execution of the first instruction, the core is to update the integrity indicator to an inactive state to cause the memory execution circuit to operate in a combined encryption and integrity mode.

10. The apparatus of claim 9, wherein in the combined encryption and integrity mode, the memory execution circuit is to access a first portion of the binary from the destination location, generate a generated integrity value for the first portion of the binary, compare the generated integrity value to the at least one integrity value for the binary, and in response to a match, decrypt and provide the first portion of the binary to a key domain associated with the requester for execution.

11. The apparatus of claim 1, wherein the memory execution circuit is to store the at least one integrity value in a metadata field of a data block of the binary.

12. The apparatus of claim 1, wherein the memory execution circuit is to store the at least one integrity value in association with the destination location of the encrypted binary image.

13. A machine-readable medium comprising instructions stored thereon, which if performed by a machine, cause the machine to:
- send a physical address associated with a destination location from a server system to a requester to enable the requester to encrypt a binary image using the physical address to generate an encrypted binary image;
- receive the encrypted binary image of the requester at the server system, the received encrypted binary image to be temporarily stored at a source location at the server system;
- load the encrypted binary image from the source location for storage at the destination location corresponding to the physical address at the server system;
- generate at least one integrity value for the encrypted binary image at the server system; and
- store the at least one integrity value in association with the encrypted binary image at the server system, the at least one integrity value inaccessible to a non-trusted entity.

14. The machine-readable medium of claim 13, further comprising instructions to cause the machine to:
- generate a cryptographic response using a first key shared between the server system and the requester; and
- send the cryptographic response to the requester to enable the requester to validate that the encrypted binary image was stored to the destination location with integrity protection.

15. The machine-readable medium of claim 13, further comprising instructions to cause the machine to in response to a request by the requester for integrity protection of the binary image, transmit the physical address associated with the destination location from the server system to the requester, to enable the requester to encrypt the binary image using a second key and the physical address to form the encrypted binary image.

16. The machine-readable medium of claim 13, further comprising instructions to cause the machine to generate the at least one integrity value for the encrypted binary image at the server system as the encrypted binary image is loaded from the source location to the destination location.

17. The machine-readable medium of claim 13, further comprising instructions to cause the machine to store the at least one integrity value in a metadata field of a data block of the encrypted binary image at the server system.

\* \* \* \* \*